United States Patent [19]

ter Beek et al.

[11] 4,230,934
[45] Oct. 28, 1980

[54] INTERNALLY HEATABLE NOZZLE HAVING A DIVISIBLE HOUSING AND A DIVISIBLE CORE

[75] Inventors: Albertus ter Beek; Gerrit J. ter Beek, both of Hengelo, Netherlands

[73] Assignee: Ter Beek Hengelo (T.B.H.) B.V., Hengelo, Netherlands

[21] Appl. No.: 37,039

[22] Filed: May 8, 1979

[51] Int. Cl.³ .............................................. F27B 14/00
[52] U.S. Cl. .................................. 219/421; 219/424; 219/530; 264/329; 264/328.15; 425/144; 425/549; 425/547
[58] Field of Search ............... 219/421, 424, 523, 530; 264/329; 425/548, 549, 563, 144; 239/133; 249/105

[56] References Cited

U.S. PATENT DOCUMENTS

| | | | |
|---|---|---|---|
| 3,010,155 | 11/1961 | Gilmore | 264/329 |
| 3,822,856 | 7/1974 | Gellert | 425/549 X |
| 3,941,540 | 3/1976 | Driscoll et al. | 425/548 X |
| 3,970,821 | 7/1976 | Crandell | 219/523 |
| 4,161,386 | 7/1979 | Osuna-Diaz | 425/549 |

Primary Examiner—Volodymyr Y. Mayewsky
Attorney, Agent, or Firm—John P. Snyder

[57] ABSTRACT

An internally heatable nozzle provided with a divisible housing having a cylindrical bore narrowed at one end towards the mouth opening of the nozzle in which bore a cylindrical core is connected at one end in said housing, said core being divisible in transverse direction, its two parts being provided with directly adjacent flanges, which flanges have throughgoing axially channels lying in the extension of the annular channel of the housing and which flanges fit in between inner shoulders on the two parts of the housing, between which parts tensile elements are operative tightening the core parts together, the core being conical at one end and being provided with an internal heating element with connecting leads passed laterally through said housing, an annular channel being arranged between said core and said housing on the side remote from the mouth opening.

7 Claims, 4 Drawing Figures

INTERNALLY HEATABLE NOZZLE HAVING A DIVISIBLE HOUSING AND A DIVISIBLE CORE

The invention relates to an internally heatable nozzle provided with a divisible housing having a cylindrical bore narrowed at one end towards the mouth opening of the nozzle in which bore a cylindrical divisible core is connected at one end in said housing, said core being conical at one end and being provided with an internal heating element with connecting leads passed laterally through said housing, an annular channel being arranged between said core and said housing and connected with at least one feeding channel passing through the housing on the side remote from the mouth opening. Such a nozzle is known from U.S. Pat. No. 3,010,155, but it has some disadvantages both with regard to its manufacture and its use. Since the core is partly integral with one of the parts of the housing, the manufacture of the nozzle is complicated and expensive, whilst in addition a high transfer of heat to the housing cannot be avoided. Moreover, the parts of the core are connected by soldering, which impairs accurate location of the conical tip. Replacement of the heating element is difficult and time-consuming, whilst the materials to be used can often be machined only with difficulty.

The invention has for its object to obviate these disadvantages and provides thereto a nozzle of the kind set forth in the preamble, which has the distinguishing characteristics that the core is divisible in transverse direction, that its two parts are provided with directly adjacent flanges, that the flanges have throughgoing, acially channels lying in the extension of the annular channel of the housing and that the flanges fit in between inner shoulders on the two parts of the housing, between which parts tensile elements are operative tightening the core parts together.

Since the core and the housing are separate from one another their manufacture can be carried out in a considerably simpler manner, whilst centering of the core part which is directed towards the nozzle opening in the housing can take place with greater accuracy.

The core preferably consist of material of high thermal conductivity, preferably a beryllium-copper alloy.

The accurate centering of the core permits the conical tip of the core to project out of the mouth opening of the nozzle so that synthetic resin products made by injection moulding using this nozzle do not need finishing treatment. Since the core parts are fastened to one another by clamping, a defective heating element can be replaced in a very simple manner. If, in addition, the core is divisible near the end remote from the mouth opening of the nozzle, the nozzle itself does not need to be removed from the mould system so that the synthetic resin present in the nozzly may remain in place while replacing the heating element.

In a preferred embodiment the flange of the core part facing towards the opening fits in a corresponding bore of the housing, said bore being concentrical with the bore for accommodating the core itself so that an extremely accurate centering of the core is ensured.

In order to reduce the transfer of heat from the core to the housing the flanges are preferably provided with circumferential grooves in the outer surface. In a very reliable embodiment as far as sealing is concerned the electrical leads of the heating element are passed through a bore extending radially through both flanges of the core.

The invention will be described more fully with reference to the drawing illustrating a preferred embodiment of the nozzle in accordance with the invention.

Figure 1:
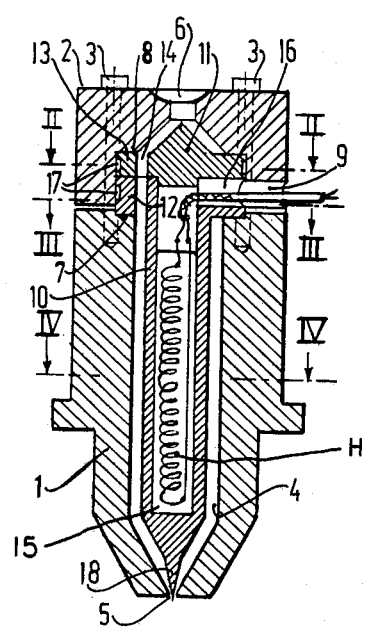
FIG. 1 is an axial sectional view of a nozzle.
Figure 2:
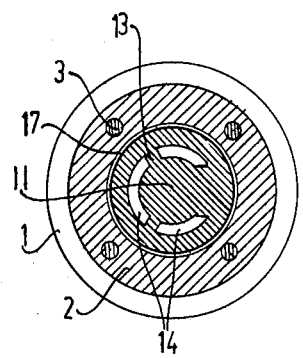
FIGS. 2, 3 and 4 are cross-sectional views taken on the lines II—II, III—III and IV—IV in FIG. 1 respectively.
Figure 4:
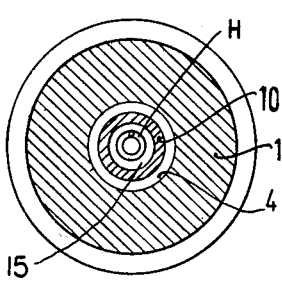
Figure 3:
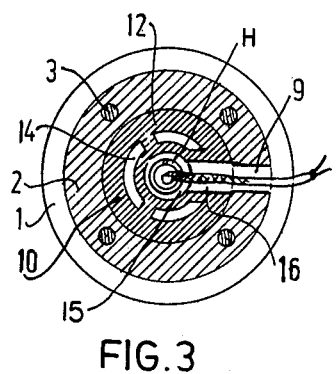

The figures show an internally heatable nozzle intended for manufacturing articles of thermo-plastic synthetic resin by injection moulding. The nozzle comprises a housing consisting of two parts 1,2, which can be drawn towards one another by means of axially bolts 3. The housing has an axial, cylindrical bore 4, which is conically narrowed at one end 18 towards a mouth opening 5 and which is also narrowed at the other end, where is opens into a usual communicating opening 6 in the form of a partly spherical recess. The two parts of the housing are divisible along a plane transverse to the center line, next to said plane wider bores are concentrically with the former bores provided in both parts so that relatively facing shoulders 7,8 are formed in the two parts of the housing. In this widened part also a lateral bore 9 is opening for passing the electrical leads of the heating element.

In the bore 4 a concentrical, substantially cylindrical core 10,11 is concentrically accommodated which is also divisible in transverse direction. At both ends the cylindrical core has a conical shape so that between the core and the housing an annular channel is left. The two parts of the core are provided with directly adjacent flanges 12,13, being tightened between the shoulders 7,8 of the housing. Each of these flange have throughgoing axially bores or channels 14 lying in the extension of the annular channel between the housing and the core for passing the synthetic resin. The core part 10 has a central bore 15 for accommodating a heating element H adapted and constructed so as to be out of contact with an therefore electrically insulated from the core 10, and, as the case may be, a thermocouple. The connecting leads of these components are passed laterally to the outside through a bore 16 passing radially across the flanges 12 and 13 and through the radial bore 9 in the upper part 2 of the housing.

The flanges 12, 13 fitting accurately in the widened bores have circumferential grooves 17 in their outer surfaces for restricting the contact area with the housing, thereby reducing the heat transfer from the core to the housing; the housing thus remaining in a comparatively cold state.

What we claim is:

1. An internally heatable nozzle comprising a divisible housing having a cylindrical bore narrowed at one end towards a mouth opening of the nozzle, in which bore a cylindrical, divisible core of thermally conductive material is connected at one end in said housing, said core having a conical end proximate to and tapering toward said mouth opening and being provided with an internal heating element with connecting leads passed laterally through said housing, an annular channel being arranged between said core and said housing and connected with at least one feeding channel passing through the housing on the side remote from the mouth opening, said core being divisible in a transverse direction to present two parts provided with directly adjacent flanges, said flanges having axially extending channels communicating said feeding channel with the channel between the housing and the core and said flanges fitting between inner shoulders on the two parts of the housing, between which parts tensile elements are operative to tighten the core parts together.

2. A nozzle as claimed in claim 1, characterized in that the conical tip of the core projects out of the mouth opening.

3. A nozzle as claimed in claim 1, characterized in that the core is made from a material having a high thermal conductivity, preferably a beryllium-copper alloy.

4. A nozzle as claimed in claim 1, characterized in that the core is divisible near the end remote from the mouth opening.

5. A nozzle as claimed in claim 1, characterized in that the flange on the part of the core facing the mouth opening fits in a corresponding bore in the housing.

6. A nozzle as claimed in claim 1, characterized in that the flanges have circumferential grooves in their outer surface.

7. A nozzle as claimed in claim 1, characterized in that the electrical leads of the heating element are passed through a transverse bore radially extending through the flanges of the core.

* * * * *

UNITED STATES PATENT AND TRADEMARK OFFICE
CERTIFICATE OF CORRECTION

PATENT NO. : 4,230,934

DATED : October 28, 1980

INVENTOR(S) : Albertus ter Beek and Gerrit Jan ter Beek

It is certified that error appears in the above-identified patent and that said Letters Patent are hereby corrected as shown below:

--- Foreign Application Priority Data

[30]  May 9, 1978  Netherlands..............78 04984 ---

Signed and Sealed this

Thirteenth Day of January 1981

[SEAL]

Attest:

SIDNEY A. DIAMOND

Attesting Officer

Commissioner of Patents and Trademarks